United States Patent
Liu et al.

(10) Patent No.: US 11,014,211 B2
(45) Date of Patent: May 25, 2021

(54) MONOCULAR VISION SIX-DIMENSIONAL MEASUREMENT METHOD FOR HIGH-DYNAMIC LARGE-RANGE ARBITRARY CONTOURING ERROR OF CNC MACHINE TOOL

(71) Applicant: DALIAN UNIVERSITY OF TECHNOLOGY, Dalian (CN)

(72) Inventors: Wei Liu, Dalian (CN); Zhenyuan Jia, Dalian (CN); Xiao Li, Dalian (CN); Yi Pan, Dalian (CN); Xin Ma, Dalian (CN); Jianwei Ma, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 70 days.

(21) Appl. No.: 16/338,971

(22) PCT Filed: Nov. 7, 2017

(86) PCT No.: PCT/CN2017/109782
§ 371 (c)(1),
(2) Date: Apr. 2, 2019

(87) PCT Pub. No.: WO2019/090487
PCT Pub. Date: May 16, 2019

(65) Prior Publication Data
US 2020/0061769 A1    Feb. 27, 2020

(51) Int. Cl.
*G06K 9/00*     (2006.01)
*B23Q 17/24*    (2006.01)

(52) U.S. Cl.
CPC ....... *B23Q 17/2409* (2013.01); *B23Q 17/249* (2013.01); *B23Q 17/2414* (2013.01); *B23Q 17/2452* (2013.01)

(58) Field of Classification Search
CPC ............ B23Q 17/2409; B23Q 17/2414; B23Q 17/2452; B23Q 17/249; B23Q 17/24;
(Continued)

(56) References Cited

U.S. PATENT DOCUMENTS

| 5,956,523 A | 9/1999 | Gottschalk |
| 6,437,823 B1 * | 8/2002 | Zhang .................. H04N 17/002 348/187 |

(Continued)

FOREIGN PATENT DOCUMENTS

| CN | 101329164 A | 12/2008 |
| CN | 107971831 A | 12/2008 |

(Continued)

OTHER PUBLICATIONS

Zhengyou Zhang, "Flexible camera calibration by viewing a plane from unknown orientations," Proceedings of the Seventh IEEE International Conference on Computer Vision, Kerkyra, Greece, 1999, pp. 666-673 vol. 1, doi: 10.1109/ICCV.1999.791289. (Year: 1999).*

(Continued)

*Primary Examiner* — Jose L Couso
(74) *Attorney, Agent, or Firm* — Muncy, Geissler, Olds & Lowe, P.C.

(57) ABSTRACT

A monocular vision six-dimensional measurement method for high-dynamic large-range arbitrary contouring error of a CNC machine tool of the present invention belongs to the field of dynamic error detection of machine tools, and relates to a six-dimensional measurement method for high-dynamic large-range arbitrary contouring error of a CNC machine tool using a monocular vision measurement technology with short-time stroboscopic illumination and a priori standard plate. The method designs a measurement fixture and a measurement system, and uses a monocular vision pose (Continued)

(as an illustration in Abstract)

algorithm to improve both the visual measurable dimension and range of interpolated contour in combination with priori knowledge. In light of the principle of error distribution, a small field of view is used to enhance the measurement accuracy of the coded primitives in the images. Then, by traversing all the acquired images using the proposed method, we can obtain the six-dimensional motion contour; and the six-dimensional contouring error caused by the imperfect machine interpolation can be computed by comparing the measured contour with the nominal one. The method enhances the measurable dimension of the vision technology through the monocular vision pose algorithm in combination with a datum transformation method, and realizes the six-dimensional measurement of large-range arbitrary contouring error of the CNC machine tool under the small field of view.

1 Claim, 7 Drawing Sheets (58) Field of Classification Search
CPC ...... B23Q 17/22; B23Q 17/00; B23Q 17/007; G06T 7/80; G06T 7/00–001; G06T 1/0014; G06T 2207/30108; G06T 2207/30141; G06T 2207/30148; G06T 2207/30164; G06K 9/46; G06K 2209/19; G06K 2009/485; G01B 21/042; G01B 11/002; G01B 11/24; G01B 11/00; G01B 11/06; G01B 11/26; G01B 11/2504; G01C 25/00; B82Y 20/00; H04N 21/25833; H04N 2201/02487; H04N 17/002; G06F 30/3323; G06F 30/398; H01S 5/2086; H01S 5/2201; H01S 5/2275; H01S 5/0042; G01N 21/956; G01N 21/9501; G01N 21/8851; G01N 21/9505; G01N 2021/8861; G01N 2021/8864; G01N 2021/8874; G01N 2223/401; G02F 1/1309; G03F 1/84; G03F 1/72; G05B 19/4093; G05B 19/4097; G05B 19/41825; G05B 2219/35134; G05B 2219/36175; G05B 2219/45165; G05B 2219/45212; G05B 2219/39105; G05B 2219/39157; Y02P 90/265; Y02P 90/087
See application file for complete search history.

(56) References Cited

U.S. PATENT DOCUMENTS

| | | | |
|---|---|---|---|
| 10,192,301 B1* | 1/2019 | Panda | G06K 9/4609 |
| 10,921,772 B2* | 2/2021 | Ma | G05B 19/19 |
| 2006/0017720 A1* | 1/2006 | Li | G06T 17/10 |
| | | | 345/419 |
| 2010/0063612 A1* | 3/2010 | Wang | G06K 9/6204 |
| | | | 700/110 |
| 2016/0124981 A1* | 5/2016 | Jiang | G06F 16/16 |
| | | | 707/821 |
| 2016/0318145 A1* | 11/2016 | Kawanishi | B23Q 17/2409 |
| 2018/0133860 A1* | 5/2018 | Fujita | B23Q 17/12 |
| 2018/0150058 A1* | 5/2018 | Shapiro | G05B 19/4097 |
| 2018/0246502 A1* | 8/2018 | Meier | G06Q 10/06 |
| 2018/0341248 A1* | 11/2018 | Mehr | G06N 20/00 |

FOREIGN PATENT DOCUMENTS

| | | |
|---|---|---|
| CN | 105043259 A | 11/2015 |
| CN | 10525341 A | 1/2016 |
| CN | 105798704 A | 7/2016 |
| JP | 2016-040531 A | 3/2016 |

OTHER PUBLICATIONS

Zhengyou Zhang, "A flexible new technique for camera calibration," in IEEE Transactions on Pattern Analysis and Machine Intelligence, vol. 22, No. 11, pp. 1330-1334, Nov. 2000, doi: 10.1109/34.888718. (Year: 2000).*

Zhengyou Zhang, "Camera calibration with one-dimensional objects," in IEEE Transactions on Pattern Analysis and Machine Intelligence, vol. 26, No. 7, pp. 892-899, Jul. 2004, doi: 10.1109/TPAMI.2004. 21. (Year: 2004).*

* cited by examiner

Fig. 1 (as an illustration in Abstract)

MONOCULAR VISION SIX-DIMENSIONAL MEASUREMENT METHOD FOR HIGH-DYNAMIC LARGE-RANGE ARBITRARY CONTOURING ERROR OF CNC MACHINE TOOL

TECHNICAL FIELD

The present invention belongs to the field of dynamic error detection of machine tools, and relates to a six-dimensional measurement method for high-dynamic large-range arbitrary contouring error of a CNC machine tool using a monocular vision measurement technology with short-time stroboscopic illumination and a priori standard plate.

BACKGROUND

Variable-curvature parts with difficult-to-machine material such as marine propellers, screw propellers for naval vessels, turbines and engine blades are widely used in major national equipment engineering. The shapes and geometrical profile accuracy of such parts directly affect the working performance of the equipment. Compared with the traditional three-axis CNC machine tool, a multi-axis machine tool solves the problem of one-time clamping and processing of most complex variable-curvature parts by virtue of control performance at any time between a cutter and a work piece pose angle in the processing course. To achieve high quality and high efficiency machining, the hard-to-process variable-curvature parts are processed by the multi-axis CNC machine tool with special interpolation contour under high-dynamic conditions. However, in such high-traverse speed conditions, due to the prominent CNC machine tool error caused by insufficient dynamic characteristics of the machine tool, the relative position between the cutter and a work piece in the operation of the machine tool produces space deviation and the processing quality of the work piece is reduced. A contouring error is an important index to evaluate the dynamic performance of CNC machine tools. Therefore, the regular evaluation of high-dynamic large-range arbitrary space contouring error (dynamic performance) of the machine tool is an important guarantee to assess the dynamic performance of the CNC machine tool and improve the processing accuracy.

The existing contouring error measurement methods of the CNC machine tool include a double ball-bar measurement method, a cross-grid encoder measurement method, a R-test measurement method, a machine vision, etc. Chen jianxiong of Fuzhou University proposed detection and identification method for four position independent errors and six volumetric errors of a rotary axis in "Geometric error measurement and identification for rotary table of multi-axis machine tool using double ball bar" published in "International Journal of Machine Tools & Manufacture" on Volume 77, Issue 77. A two-step method is used in their research. According to the error identification model and the data measured by the double ball-bar, four position independent errors and six volumetric errors are separated using the identification algorithm. Although the double ball-bar equipment has high flexibility, this one-dimensional measurement equipment can only measure contouring error of a plane circle, while for contouring error of arbitrary path, it is unavailable. Furthermore, limited to the mechanical structure of the measuring rod, the double ball-bar is very difficult to measure the contouring error of a small-radius circle that can better reflect the dynamic performance of machine tools. Swiss scholars B. Bringmann et al. proposed a comprehensive method of using the spatial contour deviation measured by R-test to assist in identifying the errors both in a linear axis and a rotary axis in "A method for direct evaluation of the dynamic 3D path accuracy of NC machine tools" published in "CIRP Annals-Manufacturing Technology" on Volume 58, Issue 1. Based on the proposed identification method, the motion deviation of the machine tool can be reduced by setting acceleration and jerk parameters. R-test has high measurement accuracy, but also small measurement range. Unidirectional measurement ranges of X, Y and Z are less than 12 mm, and linkage errors of irrelevant axes may be introduced during measurement. Soichi Ibaraki et al. of Kyoto University proposed an error measurement and identification method for machine tool installation and servo systems based on cross-grid encoder in "Diagnosis and compensation of motion errors in NC machine tools by arbitrary shape contouring error measurement" published in "Laser Metrology & Machine Performance V". The servo system is compensated with feedback signals of numerical control position to improve the contour interpolation accuracy of the machine tool. However, the equipment is cumbersome to operate and unable to detect motion error of a rotary axis.

A patent for invention CN 105798704 A "Monocular vision based method for measuring plane contouring error of machine tools" applied by Liu Wei, Yan Hongyue et al. has invented a monocular vision method for contouring error detection of a CNC machine tool. The patent for invention enhances measurement efficiency, reduces cost and realizes two-dimensional measurement of the plane interpolation contouring error of the CNC machine tool. However, with this method, shooting frame frequency of the camera is difficult to be improved due to the limited camera bandwidth, resulting the blurring effect of markers in the image taken at high traverse speed of and the final vision solving accuracy of the contouring error. Besides, this two-dimensional measurement method cannot realize the three-dimensional computation of the contouring error of CNC machine tools.

SUMMARY

The technical problem to be solved by the present invention is to overcome the defects in the prior art. For the problem that the existing single measurement method cannot realize the six-dimensional measurement of high-dynamic and large-range arbitrary contouring error of a CNC machine tool, the present invention invents a monocular vision six-dimensional method for measuring high-dynamic large-range arbitrary contouring error of a CNC machine tool. A measurement fixture and a measurement system are designed. In light of the principle of error distribution, a small field of view is selected to enhance the measurement accuracy of the visible coded primitives; in combination with priori knowledge, the monocular vision pose algorithm is used to promote vision measurable dimension and range of interpolation contouring errors of machines; the whole machine tool motion contour is represented by a selected reference primitive; then, six-dimensional information (X, Y, Z, pitch, roll and yaw) of the interpolated contour represented by the reference primitive in machine tool coordinate system is obtained through datum transformation; the method is used to traverse each shot frame image to obtain the final actual six-dimensional motion contour of the machine tool; and a six-dimensional contouring error generated by the CNC machine tool interpolation is computed by comparing the measured contour with the nominal one. The measurement system of the method has low cost and simple operation.

Figure 1:
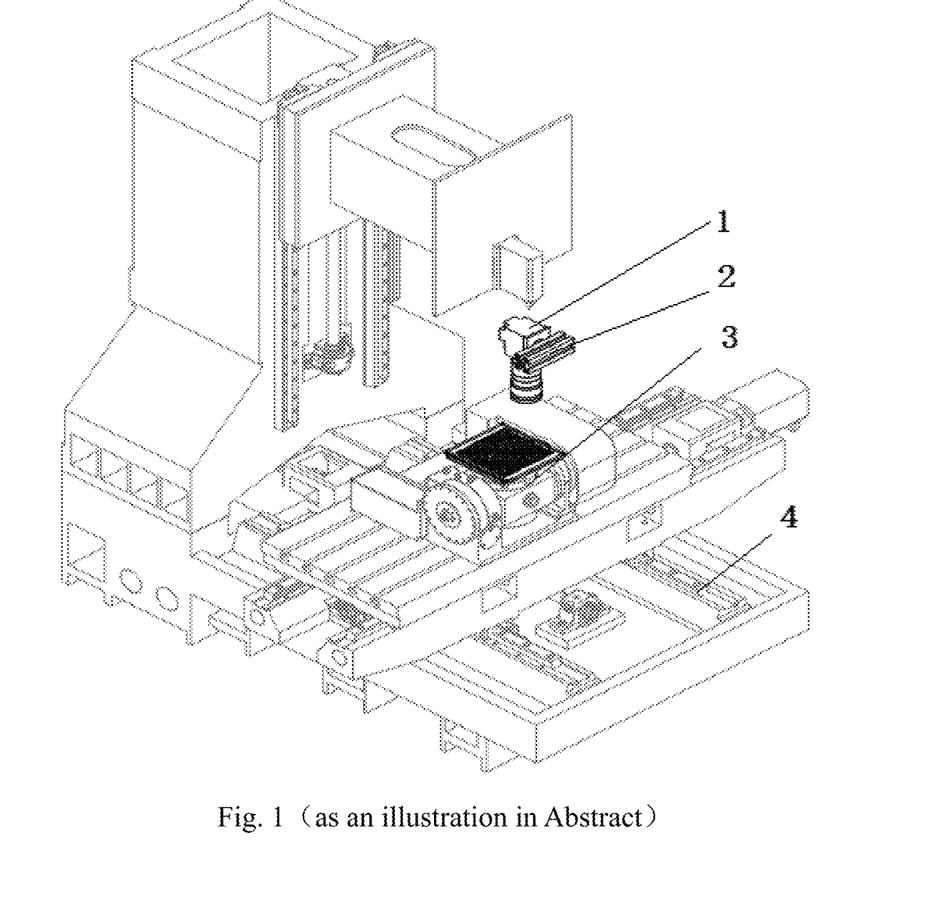
FIG. 1 is a diagram of a six-dimensional measurement system for high-dynamic large-range arbitrary contouring error of a CNC machine tool. In the figure, 1—camera; 2—camera clamp; 3—rotary table; and 4—CNC machine tool.
Figure 2:
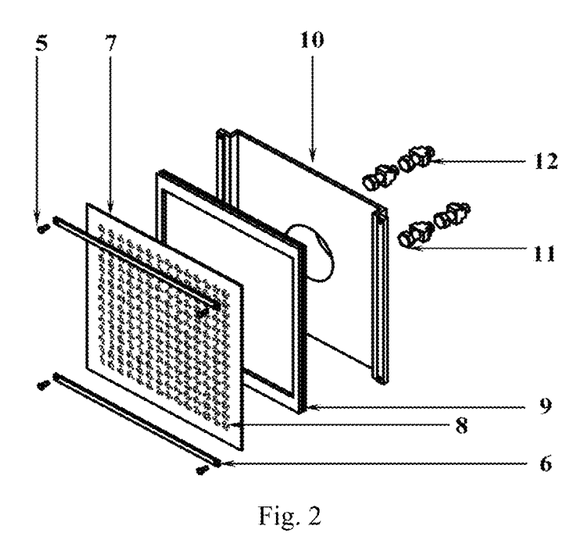
Figure 3:
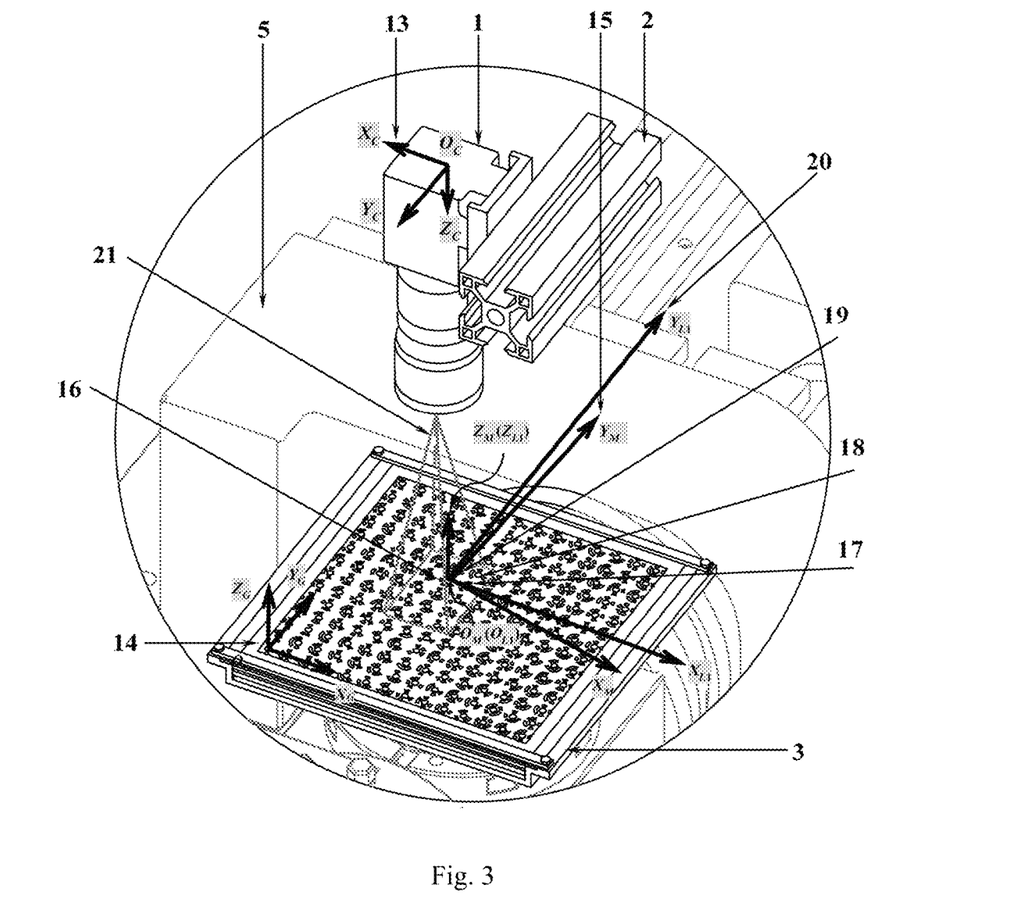
FIG. 3 is an arrangement diagram of a measurement system and each coordinate system when a machine tool does not move. In the figure, 13—camera coordinate system $O_CX_CY_CZ_C$; 14—global coordinate system $O_GX_GY_GZ_G$ of priori standard plate; 15—machine tool coordinate system $O_MX_MY_MZ_M$; 16—coded primitive $P_1^1$; 17—coded primitive 18—coded primitive $P_1^3$; 19—coded primitive $P_1^4$; 20—local coordinate system $O_{L1}X_{L1}Y_{L1}Z_{L1}$ of priori standard plate of first frame; and 21—field of view of camera.

The present invention adopts the following technical solution: A monocular vision six-dimensional measurement method for high-dynamic large-range arbitrary contouring error of a CNC machine tool is characterized in that the method designs a measurement fixture and a measuring system, and in combination with priori knowledge, the monocular vision pose algorithm is used to promote vision measurable dimension and range of interpolation contouring errors of machines; the whole machine tool motion contour is represented by a selected reference primitive; a small field of view is used to enhance the measurement accuracy of the visible coded primitives; then, six-dimensional information (X, Y, Z, pitch, roll and yaw) of the machine tool interpolation contour represented by the reference primitive in machine tool coordinate system is obtained through datum transformation; the method is used to traverse each shot frame image to obtain the final actual six-dimensional motion contour of the machine tool; a six-dimensional contouring error generated by the CNC machine tool interpolation is computed by comparing the measured contour with the nominal one; specific steps of the method are as follows:

first step: installing the measurement fixture and the measurement system the measurement fixture is composed of a base 10, a high-brightness short-time light-emitting unit 9, a priori standard plate 7 and coded primitives 8; the priori standard plate 7 is made of transparent base material, and the coded primitives 8 with unique code values and matrice distribution are coated on the priori standard plate 7; when the measurement fixture is installed, the high-brightness short-time light-emitting unit 9 is fixed to grooves on both sides of the base 10; the priori standard plate 7 is supported on the base 10; the priori standard plate 7 is pressed by two pressing plates 6; four pressing plate locking bolts 5 are used to press and fix the priori standard plate 7 through the pressing plates 6;

the measurement system comprises a camera 1, a camera clamp 2 and the measurement fixture; the camera 1 is fixed to the camera clamp 2; the camera clamp 2 is installed above the measurement fixture to collect sequential images in the motion process of the measurement fixture; the assembled measurement fixture is put on an optical three-coordinate device platform; an optical three-coordinate device calibrates a space geometry relation among the coded primitives 8 under a global coordinate system of the priori standard plate; when the measurement system is arranged, the calibrated measurement fixture is fastened to a rotary table 3 of the CNC machine tool 4 through a pressing bolt 11 and a pressing nut 12;

second step: establishing the global coordinate system of the priori standard plate the global coordinate system $O_G X_G Y_G Z_G$ 14 of the priori standard plate is established on the measurement fixture; an origin is established on the center of the coded primitive 8 in the first row and the first column, and is defined as $O_G$; the direction of the $X_G$ coordinate axis is that the origin $O_G$ downwards points to the center point of the coded primitive 8 in the first column and the last row on the array; the direction of the $Y_G$ coordinate axis is that the $O_G$ points towards the right to the center point of the coded primitive 8 in the first row and the last column on the array; the $Z_G$ coordinate axis is determined by a right-handed rule; the optical three-coordinate device is used to calibrate the space geometry relation among the coded primitives 8 under the global coordinate system $O_G X_G Y_G Z_G$ 14 of the priori standard plate to obtain three-dimensional coordinates of the coded primitives 8 under the global coordinate system $O_G X_G Y_G Z_G$ 14 of the priori standard plate; the coded primitives 8 on the priori standard plate 7 carry motion information of the CNC machine tool 4; the spatial position relationship among the coded primitives 8 is calibrated through a high-accuracy device; on the premise of ensuring calibration accuracy, the size of the priori standard plate 7 can be made as large as possible to satisfy large-scale measurement demands of the contouring error;

third step: camera calibration a camera imaging model expresses a one-to-one mapping relationship between a camera coordinate system and a world coordinate system; the camera imaging model with distortion parameters is:

$$Z_c \begin{bmatrix} u+\delta_x \\ v+\delta_y \\ 1 \end{bmatrix} = \begin{bmatrix} C_x & 0 & u_0 \\ 0 & C_y & v_0 \\ 0 & 0 & 1 \end{bmatrix} \begin{bmatrix} R_C^I & T_C^I \\ 0^T & 1 \end{bmatrix} \begin{bmatrix} X_w \\ Y_w \\ Z_w \\ 1 \end{bmatrix} = K \cdot T \cdot \begin{bmatrix} X_w \\ Y_w \\ Z_w \\ 1 \end{bmatrix} \quad (1)$$

where $(X_w, Y_w, Z_w)$ is a three-dimensional coordinate of the center point of the coded primitive 8 under the world coordinate system; K is an intrinsic matrix of the camera 1; T is an extrinsic matrix of the camera 1; (u,v) is a two-dimensional coordinate of the center point of the coded primitive 8 in an image plane; $(u_0, v_0)$ is coordinate of the principal point; $(C_x, C_y)$ is an equivalent focal length in transverse and longitudinal direction; $R_C^I$ and $T_C^I$ are respectively rotation and translation transformation matrixes between the camera coordinate system and the world coordinate system; $(\delta_x, \delta_y)$ is a distortion of an image point in the directions of x and y caused by an imperfect optical system; checker calibration board is placed in multiple positions in the field of view 21 of the camera 1 and the images is acquired; distortion parameters as well as the intrinsic and extrinsic matrixes of the camera 1 are calibrated through a calibration algorithm proposed by Zhengyou Zhang, "A flexible new technique for camera calibration," in IEEE Transactions on Pattern Analysis and Machine Intelligence, vol. 22, no. 11, pp. 1330-1334, November 2000, doi: 10.1109/34.888718 (Year: 2000).

fourth step: high-definition no-fuzzy image collection and processing for high-dynamic and large-range interpolation contour of CNC machine tool on the basis of completing the installation and arrangement of the measurement fixture, images of the contour interpolated by the CNC machine tool 4 are collected; because requirements for the measurement accuracy of the contouring error are high, the required field of view 21 for shooting is small; firstly, the parameters of the camera 1 are adjusted so that the camera 1 is under the optimal shooting field of view and frame frequency; subsequently, the camera 1 and the high-brightness short-time light-emitting unit 9 are synchronously triggered; light-emitting time and light-emitting intensity of the high-brightness short-time light-emitting unit 9 are set to ensure that the high-brightness short-time light-emitting unit 9 penetrates through the base of the priori standard plate 7 within the exposing time of the camera 1 and supplements light for the coded primitives 8; high-traverse speed machine tool speed which can reflect dynamic performance of the machine tool is selected; each motion axis of the CNC machine tool 4 is driven to interpolate the contour in accordance with the program instructions; in the process of image collection of the machine tool movement, the camera 1 is fixed and the machine tool moves; clear and no-fuzzy sequential images of the coded primitives 8 are collected under the assistance of the high-brightness short-time light-emitting unit 9;

after the images are collected, the code values represented by each coded primitive 8 on the images are recognized, then the two-dimensional pixel coordinates of the center point of each coded primitive 8 which is decoded is positioned through a gray centroid method; the center of coded primitives is positioned by an extraction algorithm of the gray centroid method, with a computation expression as follows:

$$\begin{cases} x = \dfrac{\sum_{i=1}^{m}\sum_{j=1}^{n} i \times f(i,j)}{\sum_{i=1}^{m}\sum_{j=1}^{n} f(i,j)} \\ y = \dfrac{\sum_{i=1}^{m}\sum_{j=1}^{n} j \times f(i,j)}{\sum_{i=1}^{m}\sum_{j=1}^{n} i \times f(i,j)} \end{cases} \quad (2)$$

where (i, j) represents the pixel point in image plane; m and n are the number of pixels included in the image in the transverse direction and the longitudinal direction; (x, y) is a center-of-mass coordinate of the image; f(i, j) is a gray value at the pixel coordinate (i, j);

fifth step: six-dimensional computation for high-dynamic and large-range arbitrary contouring error of CNC machine tool in the method, a small field of view 21 is used to enhance the measurement accuracy of the coded primitives 8 in the field of view; in combination with priori knowledge, the monocular vision pose algorithm is used to promote vision measurable dimension and range of interpolation contouring errors of machines; the whole machine tool motion contour is represented by a selected reference primitive; the position of the reference primitive in an invisible region of the field of view 21 is computed by the pixel coordinates of the primitives in visible region in combination with high-accuracy priori constraints; the motion contour represented by the reference primitive in machine tool coordinate system is obtained through datum transformation by traversing all the images; a six-dimensional contouring error generated by the interpolation of the CNC machine tool 4 is computed by comparing the measured contour with the nominal one; six-dimensional computation steps for high-dynamic and large-range arbitrary contouring error of CNC machine tool are specifically as follows:

the field of view 21 of the camera 1 is N×N (unit: mm); the external dimension of the priori standard plate 7 is M×M (unit: mm); N is much smaller than M; besides the above global coordinate system $O_G X_G Y_G Z_G$ 14 of the priori standard plate, involved coordinate systems also comprise a camera coordinate system $O_C X_C Y_C Z_C$ 13, a machine tool coordinate system $O_M X_M Y_M Z_M$ 15 and a local coordinate system $O_{Li} X_{Li} Y_{Li} Z_{Li}$ 22 of the priori standard plate; the origin of the camera coordinate system $O_C X_C Y_C Z_C$ 13 is established on an optical center $O_C$; when the CNC machine tool 4 does not move, four coded primitives $P_1^1$ 16, $P_1^2$ 17, $P_1^3$ 18 and $P_1^4$ 19 arranged in a rectangle in the field of view are selected in the first frame image; the coded primitive $P_1^1$ 16 is selected as the reference primitive; the motion contour of the CNC machine tool 4 synthesized by the interpolation motion axis of each axis is represented by the coded primitive $P_1^1$ 16; the coordinate in the global coordinate system $O_G X_G Y_G Z_G$ 14 of the priori standard plate is $^G P_1^1$ ($^G X_1^1$, $^G Y_1^1$, $^G Z_1^1$); the machine tool coordinate system $O_M X_M Y_M Z_M$ 15 is established by taking $P_1^1$ 16 as an origin; the direction of each coordinate axis of the machine tool coordinate system $O_M X_M Y_M Z_M$ 15 is consistent with the direction of each motion axis of the CNC machine tool 4; the machine tool is controlled to drive the measurement fixture to respectively move along the X axis direction of the machine tool to multiple positions; the three-dimensional coordinate (x,y,z) of $P_1^1$ 16 relative to the camera coordinate system $O_C X_C Y_C Z_C$ 13 in each position is computed using a monocular vision pose solving algorithm; on this basis, a vector in the X axis direction is fitted; the Y axis of the machine tool coordinate system $O_M X_M Y_M Z_M$ 15 is determined in accordance with the same rule; the Z axis of the machine tool coordinate system $O_M X_M Y_M Z_M$ 15 is determined by the right-handed rule; X axis and Y axis are established in accordance with the following formula:

$$\begin{cases} \dfrac{x - ^C X_1^1}{m_x} = \dfrac{y - ^C Y_1^1}{n_x} = \dfrac{z - ^C Z_1^1}{p_x} \\ \dfrac{x' - ^C X_1^1}{m_y} = \dfrac{y' - ^C Y_1^1}{n_y} = \dfrac{z' - ^C Z_1^1}{p_y} \\ \begin{pmatrix} ^M X \\ ^M Y \\ ^M Z \\ 1 \end{pmatrix} = M_C^M \begin{pmatrix} ^C X \\ ^C Y \\ ^C Z \\ 1 \end{pmatrix} \end{cases} \quad (3)$$

where $^C P_1^1$($^C X_1^1$, $^C Y_1^1$, $^C Z_1^1$), is the three-dimensional coordinates of the coded primitive $P_1^1$ 16 in the camera coordinate system $O_C X_C Y_C Z_C$ 13 in the first frame image; (x',y',z') is the three-dimensional coordinates of point $P_1^1$ 16 relative to the camera coordinate system $O_C X_C Y_C Z_C$ 13 in each position computed using the monocular vision pose solving algorithm by the measurement fixture that moves along the X axis direction of the machine tool to multiple positions; ($m_x,n_x,p_x$) is a vector in the X axis direction of the machine tool coordinate system $O_M X_M Y_M Z_M$ 15; ($m_y,n_y,p_y$) is a vector in the Y axis direction of the machine tool coordinate system $O_M X_M Y_M Z_M$ 15; ($^C X$, $^C Y$, $^C Z$) is a three-dimensional coordinates of a point in the camera coordinate system $O_C X_C Y_C Z_C$ 13; ($^M X$, $^M Y$, $^M Z$) is a three-dimensional coordinates of a point in the machine tool coordinate system $O_M X_M Y_M Z_M$ 15; $M_C^M$ is a transformation matrix between the camera coordinate system $O_C X_C Y_C Z_C$ 13 and the machine tool coordinate system $O_M X_M Y_M Z_M$ 15;

during measurement, the priori standard plate 7 continuously makes interpolation motion along with the machine tool, and the coded primitives 8 thereon are continuously imaged on the camera 1; in the motion process of the CNC machine tool 4, the camera 1 collects G frame images totally; four coded primitives 8 that appears in the field of view in the ith frame image and arranged in a rectangle are $P_i^1$ 23, $P_i^2$ 24, $P_i^3$ 25 and $P_i^4$ 26; the coordinates of the centers of the four coded primitives 8 in the global coordinate system $O_G X_G Y_G Z_G$ 14 of the priori standard plate are $^G P_i^1({}^G X_i^1, {}^G Y_i^1, {}^G Z_i^1)$, $^G P_i^2({}^G X_i^2, {}^G Y_i^2, {}^G Z_i^2)$, $^G P_i^3({}^G X_i^3, {}^G Y_i^3, {}^G Z_i^3)$ and $^G P_i^4({}^G X_i^4, {}^G Y_i^4, {}^G Z_i^4)$; corresponding two-dimensional pixel coordinates on the image plane are $p_i^1(u_i^1, v_i^1)$, $p_i^2(u_i^2, v_i^2)$, $p_i^3(u_i^3, v_i^3)$ and $p_i^4(u_i^4, v_i^4)$; a local coordinate system $O_{Li} X_{Li} Y_{Li} Z_{Li}$ 22, (i=1, 2 ... G) of the priori standard plate under the ith frame is established; the coordinate system takes $P_i^1$ 23 as a coordinate origin; $X_{Li}$ and $Y_{Li}$ coordinate axis directions are respectively parallel to $X_G$ and $Y_G$ directions of the global coordinate system $O_G X_G Y_G Z_G$ 14 of the priori standard plate; $Z_{Li}$ coordinate axis is determined by the right-handed rule; three-dimensional coordinates of the centers of the selected four coded primitives 8 in the local coordinate system $O_{Li} X_{Li} Y_{Li} Z_{Li}$ 22 of the priori standard plate are:

$$\left\{ \begin{pmatrix} {}^{Li}X_i^m \\ {}^{Li}Y_i^m \\ {}^{Li}Z_i^m \\ 1 \end{pmatrix} = \begin{pmatrix} I & T_i^T \\ 0 & 1 \end{pmatrix} \begin{pmatrix} {}^G X_i^m \\ {}^G Y_i^m \\ {}^G Z_i^m \\ 1 \end{pmatrix} \right. \quad m = 1, 2, 3, 4 \tag{4}$$

$$T_i = ({}^G X_i^1, {}^G Y_i^1, {}^G Z_i^1)$$

where $T_i$ is a transformation matrix between the global coordinate system $O_G X_G Y_G Z_G$ 14 of the priori standard plate of the ith frame image and the local coordinate system $O_{Li} X_{Li} Y_{Li} Z_{Li}$ 22 of the priori standard plate; the ith frame image i=1, 2 ... G is computed as follows:

$$\begin{cases} Y_i^2 + Z_i^2 - 2Y_i Z_i \cos\alpha = a'^2 \\ X_i^2 + Z_i^2 - 2X_i Z_i \cos\beta = b'^2 \\ X_i^2 + Y_i^2 - 2X_i Y_i \cos\gamma = c'^2 \end{cases} \tag{5}$$

where $X_i$ is a distance from the optical center $O_C$ in the camera coordinate system $O_C X_C Y_C Z_C$ 13 to the $P_i^1$ 23 point on the priori standard plate 7 of the ith frame; $Y_i$ is a distance from the optical center $O_C$ in the camera coordinate system $O_C X_C Y_C Z_C$ 13 to the $P_i^2$ 24 point on the priori standard plate 7 of the ith frame; $Z_i$ is a distance from the optical center $O_C$ in the camera coordinate system $O_C X_C Y_C Z_C$ 13 to the $P_i^4$ 26 point on the priori standard plate 7 of the ith frame; a' is a distance between $P_i^1$ 23 and $P_i^2$ 24 in the global coordinate system $O_G X_G Y_G Z_G$ 14 of the priori standard plate 7 of the ith frame; b' is a distance between $P_i^2$ 24 and $P_i^4$ 26 in the global coordinate system $O_G X_G Y_G Z_G$ 14 of the priori standard plate of the ith frame; c' is a distance between $P_i^1$ 23 and $P_i^2$ 26 in the global coordinate system $O_G X_G Y_G Z_G$ 14 of the priori standard plate of the ith frame; $\alpha$ is an angle $\angle P_i^2 O_C P_i^4$ between straight lines $O_C P_i^2$ and $O_C P_i^4$; $\beta$ is an angle $\angle P_i^1 O_C P_i^4$ between straight lines $O_C P_i^1$ and $O_C P_i^4$; $\gamma$ is an angle $\angle P_i^1 O_C P_i^2$ between straight lines $O_C P_i^1$ and $O_C P_i^2$;

$$\cos\alpha = \left(\frac{u_i^2 - u_0}{C_x}\right)\left(\frac{u_i^4 - u_0}{C_x}\right) + \left(\frac{v_i^2 - v_0}{C_y}\right)\left(\frac{v_i^4 - v_0}{C_y}\right) \bigg/ \sqrt{\left(\frac{u_i^2 - u_0}{C_x}\right)^2 + \left(\frac{v_i^2 - v_0}{C_y}\right)^2} +$$

$$\sqrt{\left(\frac{u_i^4 - u_0}{C_x}\right)^2 + \left(\frac{v_i^4 - v_0}{C_y}\right)^2},$$

$$\cos\gamma = \left(\frac{u_i^1 - u_0}{C_x}\right)\left(\frac{u_i^2 - u_0}{C_x}\right) +$$

$$\left(\frac{v_i^1 - v_0}{C_y}\right)\left(\frac{v_i^2 - v_0}{C_y}\right) \bigg/ \sqrt{\left(\frac{u_i^1 - u_0}{C_x}\right)^2 + \left(\frac{v_i^1 - v_0}{C_y}\right)^2} +$$

$$\sqrt{\left(\frac{u_i^2 - u_0}{C_x}\right)^2 + \left(\frac{v_i^2 - v_0}{C_y}\right)^2},$$

$$\cos\beta = \left(\frac{u_i^1 - u_0}{C_x}\right)\left(\frac{u_i^4 - u_0}{C_x}\right) +$$

$$\left(\frac{v_i^1 - v_0}{C_y}\right)\left(\frac{v_i^4 - v_0}{C_y}\right) \bigg/ \sqrt{\left(\frac{u_i^1 - u_0}{C_x}\right)^2 + \left(\frac{v_i^1 - v_0}{C_y}\right)^2} +$$

$$\sqrt{\left(\frac{u_i^4 - u_0}{C_x}\right)^2 + \left(\frac{v_i^4 - v_0}{C_y}\right)^2};$$

k=2 cos α, q=2 cos β, r=2 cos γ, $c'^2 = v Z_i^2$, $a'^2 = ac'^2 = av Z_i^2$, $b'^2 = bc'^2 = bv Z_i^2$, $Y_i$ $b Z_i$, $P_i^1$ 23, $P_i^2$ 24 and $P_i^4$ 26 are set as three spatial points in the ith frame that are not coplanar and whose position relation is known, and $k^2 + q^2 + r^2 - kgr - 1 \neq 0$ is satisfied; equation (5) may be rewritten as formula (6);

$$\begin{cases} (1-a)y^2 - ax^2 + axyr - yk + 1 = 0 \\ (1-b)x^2 - by^2 + bxyr - xq + 1 = 0 \end{cases} \tag{6}$$

the degenerate solution of the formula (6) is eliminated through an optimization algorithm to obtain four acceptable zero solutions; $P_i^3$ 25 is used as a priori constraint to obtain unique solutions of $X_i$, $Y_i$ and $Z_i$; then three-dimensional coordinates $^C P_i^1({}^C X_i^1, {}^C Y_i^1, {}^C Z_i^1)$, $^C P_i^2({}^C X_i^2, {}^C Y_i^2, {}^C Z_i^2)$ and $^C P_i^4({}^C X_i^4, {}^C Y_i^4, {}^C Z_i^4)$ of $P_i^1$ 23, $P_i^2$ 24 and $P_i^4$ 26 points on the priori standard plate 7 of the ith frame under the camera coordinate system $O_C X_C Y_C Z_C$ 13 are expressed as the following formula:

$$\begin{cases} {}^C X_i^j = \frac{u_i^1}{C_x} \cdot |O_C P_i^j| \bigg/ \sqrt{\left(\frac{u_i^1}{C_x}\right)^2 + \left(\frac{v_i^1}{C_y}\right)^2 + 1} \\ {}^C Y_i^j = \frac{v_i^1}{C_y} \cdot |O_C P_i^j| \bigg/ \sqrt{\left(\frac{u_i^1}{C_x}\right)^2 + \left(\frac{v_i^1}{C_y}\right)^2 + 1} \\ {}^C Z_i^j = 1 \cdot |O_C P_i^j| \bigg/ \sqrt{\left(\frac{u_i^1}{C_x}\right)^2 + \left(\frac{v_i^1}{C_y}\right)^2 + 1} \end{cases} \tag{7}$$

$j = 1, 2, 4; i = 1, 2 \ldots G;$ on the basis of the known $^{Li}P_i^j({}^{Li}X_i^j, {}^{Li}Y_i^j, {}^{Li}Z_i^j)$ and $^C P_i^j({}^C X_i^j, {}^C Y_i^j, {}^C Z_i^j)$, a Kabsch algorithm is used for solving a rotation matrix $R_i'$ and a translation matrix $t_i'$ of the local coordinate system $O_{Li}X_{Li}Y_{Li}Z_{Li}$ 22 of the priori standard plate of the ith frame relative to the camera coordinate system $O_CX_CY_CZ_C$ 13; $t_i'$ is the three-dimensional coordinates $t_1'={}^CP_i^1({}^CX_i^1, {}^CY_i^1, {}^CZ_i^1)$ of the origin $P_i^1$ 23 of the local coordinate system $O_{Li}X_{Li}Y_{Li}Z_{Li}$ 22 of the priori standard plate of the ith frame in the camera coordinate system $O_CX_CY_CZ_C$ 13; a pitch angle $\theta_i'$, a roll angle $\Phi_i'$ and a yaw angle $\psi_i'$ between two coordinate systems are computed through $R_i'$ separation; the three-dimensional coordinates $$({}^CX_i, {}^CY_i, {}^CZ_i);$$

$$({}^CX_i, {}^CY_i, {}^CZ_i)^T = \begin{pmatrix} R_i' & t_i'^T \\ 0 & 1 \end{pmatrix} \begin{pmatrix} I & T_i^T \\ 0 & 1 \end{pmatrix} ({}^GX_i, {}^GY_i, {}^GZ_i)^T$$

of the reference primitive $P_1^1$ in the camera coordinate system $O_CX_CY_CZ_C$ 13 of the ith frame is computed according to a known spatial constraint among the coded primitives 8 of the priori standard plate 7;

the measured contouring error is represented in the machine tool coordinate system $O_MX_MY_MZ_M$15, and the contour measured by the camera 1 needs to be subjected to coordinate transformation to correctly compute the machine tool contouring error; a pose transformation formula of the machine tool coordinate system $O_MX_MY_MZ_M$15 and the local coordinate system $O_{Li}X_{Li}Y_{Li}Z_{Li}$22 of the priori standard plate is:

$$M_i = M_C^M \begin{pmatrix} R_i' & t_i'^T \\ 0 & 1 \end{pmatrix}, \quad (8)$$

where $M_i$ is a transformation matrix between the local coordinate system $O_{Li}X_{Li}Y_{Li}Z_{Li}$22 of the priori standard plate under the ith frame image and the machine tool coordinate system $O_MX_MY_MZ_M$15; a pitch angle $\theta_i$, a roll angle $\Phi_i$ and a yaw angle $\psi_i$ of the ith frame standard plate relative to the machine tool coordinate system $O_MX_MY_MZ_M$15 are separated from $M_i$; all image sequences are traversed to obtain a six-degree-of-freedom contour $L_r$ of the whole machine tool represented by the reference primitive, where $L_r({}^MX_i, {}^MY_i, {}^MZ_i, \theta_i, \Phi_i, \psi_i)$ and i=1, 2 . . . G; a six-degree-of-freedom contouring error E generated by interpolation of the CNC machine tool 4 is computed by comparing the actual six-degree-of-freedom contour $L_r$ with the nominal contour $L_m$:

$$E = L_r - L_m. \quad (9)$$

Compared with the existing vision method, the present invention has the beneficial effects of enhancing vision measurable interpolation speed of the CNC machine tool, breaking through measurable speed limit of the machine tool and extending vision measurable interpolation traverse speed range of the CNC machine tool. Furthermore, to ensure measurement accuracy of the contouring error, the field of view is less. The present invention uses a vision pose algorithm to realize six-dimensional measurement for large-range arbitrary contouring error of the CNC machine tool under small field of view in combination with priori spatial constraints among the coded primitives on the large-size standard plate, and extends measurable motion range and measurement dimension of the vision system. In the measurement process, only a single camera, a specially-made measurement fixture and a specially-made measurement system are adopted, so that operation simplicity is enhanced while the cost is reduced.

DESCRIPTION OF DRAWINGS

FIG. 2 is an exploded view of a measurement fixture. In the figure, 5—pressing plate locking bolt; 6—pressing plate; 7—priori standard plate; 8—coded primitive; 9—high-brightness short-time light-emitting unit; 10—base; 11—pressing bolt; and 12—pressing nut.

DETAILED DESCRIPTION

Specific embodiments of the present invention are described below in detail in combination with the technical solution and accompanying drawings.

To reflect the arbitrariness of the path, a plane interpolation equiangular spiral contour of a CNC machine tool is taken as a research object, and the six-dimensional contouring error is solved using the vision detection method of the present invention. The equation of the equiangular spiral contour to be measured is $r = 0.189\ e^{0.221\theta}$, $\theta[0,7.3\pi]$. Six-dimensional solving steps of the equiangular spiral contouring error are specifically as follows:

First Step: Designing and Installing a Measurement Fixture and a Measurement System As shown in FIG. 1, a measurement object is a self-designed CNC machine tool 4. The strokes of the CNC machine tool 4 in X direction and Y direction are respectively 800 mm and 900 mm. To reflect the dynamic performance of the machine tool, the interpolation speed of the machine tool is selected as 3 m/min. The measurement system comprises a camera 1, a camera clamp 2 and the measurement fixture. In the embodiment, the selected camera 1 has a frame frequency of 60 fps, a resolution of 3300×3300 pixels and an exposing time of 5000 μs. The camera clamp 2 can realize six-pose adjustment of the camera 1. The measurement fixture is composed of a base 10, a high-brightness short-time light-emitting unit 9, a priori standard plate 7 and coded primitives 8. The measurement fixture is installed on a rotary table of the CNC machine tool.

FIG. 2 is an exploded view of the measurement fixture. The priori standard plate 7 is made of transparent glass material having an external dimension of 250 mm×250 mm, and 196 coded primitives 8 distributed in a matrix are photoetched on the priori standard plate 7. Each coded primitive 8 is sampled and valued from [65, 637], and has unique code value. The center distance between adjacent coded primitives 8 is 16 mm.

Each unit is assembled in accordance with the exploded view of the measurement fixture shown in FIG. 2. The specific assembling sequence is: the high-brightness short-time light-emitting unit 9 is inserted into grooves on both sides of the base 10; the priori standard plate 7 is put on the base 10; the priori standard plate 7 is pressed by two pressing plates 6; and four pressing plate locking bolts 5 are used to press and fix the priori standard plate 7 through the pressing plates 6.

The assembled measurement fixture is put on an optical three-coordinate device platform; and a global coordinate system $O_G X_G Y_G Z_G 14$ of the priori standard plate is established, as shown in FIG. 3. The optical three-coordinate device is used to calibrate the space geometry relation among the coded primitives 8 in the global coordinate system $O_G X_G Y_G Z_G 14$ of the priori standard plate; the measurement and detection accuracy of an optical three-coordinate space is 0.5 μm; and three-dimensional coordinates of the coded primitives 8 in the global coordinate system $O_G X_G Y_G Z_G 14$ of the priori standard plate are obtained.

The calibrated measurement fixture is fastened to a rotary table of the CNC machine tool 4 through a pressing bolt 11 and a pressing nut 12. In installation, the camera 1 is fixed to the camera clamp 2; and six-dimensional pose parameters of the camera 1 are adjusted to ensure that the camera clamp 2 is positioned above the measurement fixture to collect sequential images of the coded primitives 8 in the motion process of the measurement fixture. Imaging parameters of the camera 1 are adjusted. The field of view 21 of the camera 1 is 40 mm×40 mm, and the measurement distance is about 337 mm.

Second Step: Camera Calibration

High-accuracy two-dimensional checker calibration board are placed in 16 positions in the field of view 21 of the camera 1; and the camera 1 is triggered in each position to shoot the images of the calibration boards. Intrinsic and extrinsic parameters and distortion parameters of the camera 1 are calibrated through a calibration algorithm proposed by Zhengyou Zhang, "A flexible new technique for camera calibration," in IEEE Transactions on Pattern Analysis and Machine Intelligence, vol. 22, no. 11, pp. 1330-1334, November 2000, doi: 10.1109/34.888718 (Year: 2000) in combination with the formula (1). The equivalent focal length of the calibrated transverse direction and longitudinal direction is: $(\alpha_x, \alpha_y)=(14959.25, 14959.68)$; the principal point of the image is $(u_0, v_0)=(2557.11, 2599.79)$; five distortion factors to be solved for expressing distortion are (0.10328, −0.23054, 0.00045, 0.00012, 0).

Figure 4:
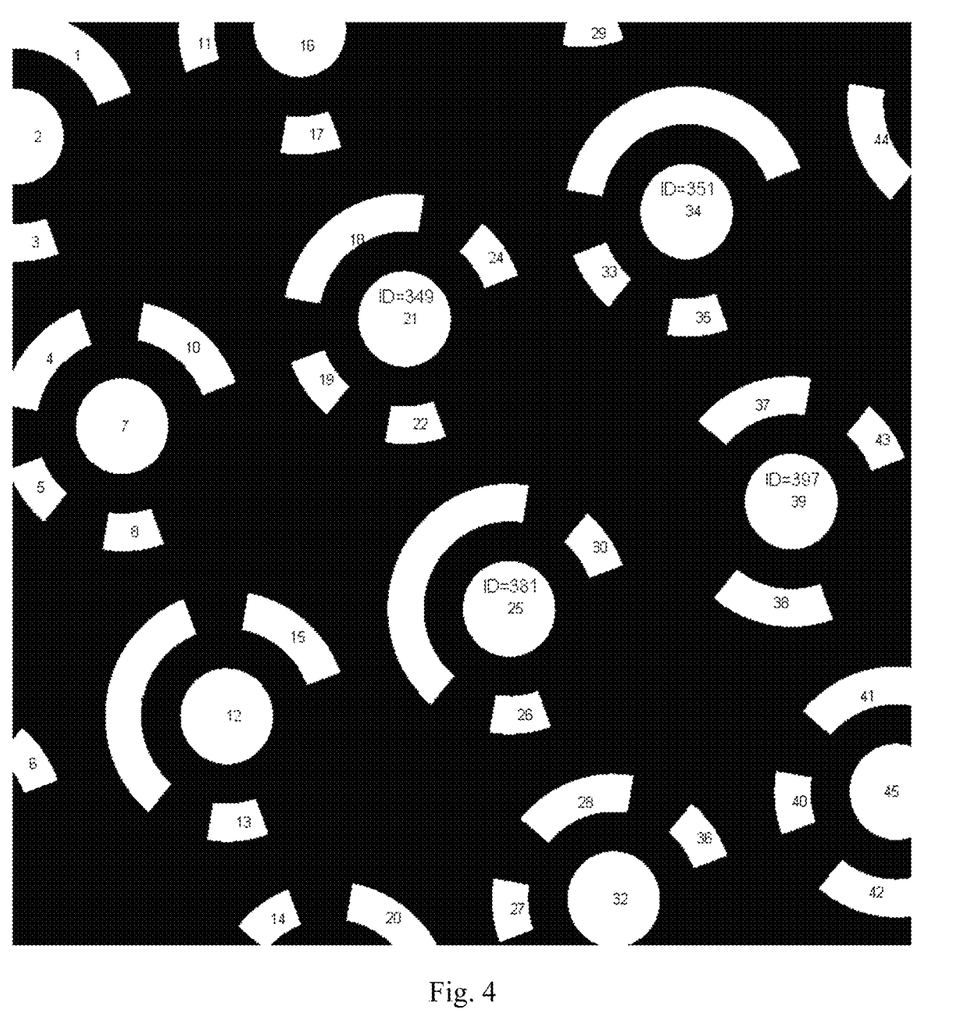
FIG. 4 shows an identification and positioning result of a coded primitive of the 300th frame image.

Third step: high-definition no-fuzzy image collection and processing for high-dynamic and large-range interpolation contour of CNC machine tool Image sequence of the plane equiangular spiral contour interpolated by the CNC machine tool 4 is collected and processed. The camera 1 and the high-brightness short-time light-emitting unit 9 are synchronously triggered, then the X axis and Y axis of the CNC machine tool 4 are driven to interpolate the contour; and the light-emitting time of the high-brightness short-time light-emitting unit 9 in each frame is set as 700 μs to ensure high contrast of the collected sequential images. After the images are collected, the code value of the coded primitive 8 in each frame image is identified, and the pixel coordinates of the center point of each coded primitive 8 is positioned through a gray centroid method in combination with the formula (2). FIG. 4 shows a processing result of image identification and positioning of a coded primitive 8.

Fourth step: six-dimensional computation for high-dynamic and large-range arbitrary contouring error of CNC machine tool The field of view 21 of the adopted camera 1 is 40 mm×40 mm; the external dimension of the priori standard plate 7 is 250 mm×250 mm; the scope of the measured equiangular spiral contour is [90 mm, 70 mm]; and the field of view 21 of the camera 1 is less than the range of the contour interpolated by the machine tool. The whole machine tool motion contour is represented by a coded primitive 8 selected on the first frame image. The position of this primitive in an invisible region is estimated through a space geometry relation among the coded primitives 8 on the large-size priori standard plate 7, so as to realize large-range contouring error measurement of the CNC machine tool 4. Specific steps are as follows:

Step 1 The camera coordinate system $O_C X_C Y_C Z_C 13$ is established with reference to FIG. 3; the coded primitive $P_1^1$ 16 with a code value of 235 in the sixth row and the ninth column on the priori standard plate is selected from the first image frame as a reference primitive; the coded primitive 8 with a code value of 237 in the sixth row and the tenth column is selected as a second coded primitive $P_1^2$ 17; the coded primitive 8 with a code value of 285 in the seventh row and the tenth column is selected as a third coded primitive $P_1^3$ 18; the coded primitive 8 with a code value of 283 in the seventh row and the ninth column is selected as a fourth coded primitive $P_1^4$ 19; the coded primitive $P_1^1$ 16 with a code value of 235 is selected as an origin, so as to establish a local coordinate system $O_{L1} X_{L1} Y_{L1} Z_{L1} 20$ and a machine tool coordinate system $O_M X_M Y_M Z_M 15$ of the first frame priori standard plate; and a transformational relation between the camera coordinate system $O_C X_C Y_C Z_C 13$ and the machine tool coordinate system $O_M X_M Y_M Z_M 15$ is established according to the formula (3), as follows:

$$M_C^M = \begin{bmatrix} -1 & -0.0024 & 0.0035 & 0.243252 \\ 0.0024 & -1.0000 & -0.0001 & -0.682648 \\ 0.0035 & -0.0001 & 1.0000 & -337.653 \\ 0 & 0 & 0 & 1 \end{bmatrix}.$$

Step 2 The camera 1 shoots 500 images in the whole contour measurement process; the embodiment analyzes and shoots the 300th frame image; the coded primitive on the ninth row and the eighth column is selected as a first coded primitive $P_{300}^1$ 22 selected by the 300th frame; the coded primitive on the ninth row and the ninth column is selected as a second coded primitive $L_{300}^2$ 23 of the 300th frame; the coded primitive in the tenth row and the ninth column is selected as a third coded primitive $P_{300}^3$ 24 of the 300th frame; and the coded primitive in the tenth row and the eighth column is selected as a fourth coded primitive $P_{300}^4$ 25 of the 300th frame. The local coordinate system $O_{L300}$-$X_{L300}Y_{L300}Z_{L300}$ 21 of the priori standard plate under the 300th frame is established. The coordinates of four points in the global coordinate system $O_G$-$X_GY_GZ_G$ 14 of the priori standard plate are respectively (112.0010, 128.0024, 0.0110), (127.9990, 128.0021, 0.0111), (128.0012, 144.0037, 0.0120) and (112.0008, 144.0057, 0.0146). The coordinates of four points in the local coordinate system $O_{L300}$-$X_{L300}Y_{L300}Z_{L300}$ 21 of the priori standard plate are computed through the formula (5): (0, 0, 0), (15.9980, −0.0030, −0.0010), (16.0003, 16.0013, 0.0010) and (−0.0002, 16.0033, 0.0036). The pixel coordinates on the image plane of the camera 1 are (1452.39, 1071.15), (2497.23, 683.88), (2884.75, 1729.45) and (1839.66, 2116.14). $^CX_{300}$, $^CY_{300}$, $^CZ_{300}$, pitch angle $\theta_{300}'$, roll angle $\Phi_{300}'$ and yaw angle $\psi_{300}'$ of the priori standard plate 7 of the 300th frame image under the camera coordinate system $O_CX_CY_CZ_C$ 13 are computed according to formulas 5-7. Computation results are: (−10.9098 mm, −3.08975 mm, 337.696, −179.931°, 0.19436°), −0.00356046°.

Step 3 The six-dimensional information of $^MX_{300}$, $^MY_{300}$, $^MZ_{300}$, pitch angle $\theta_{300}$, roll angle $\Phi_{300}$ and yaw angle $\psi_{300}$ of the 300th frame image in the machine tool coordinate system $O_MX_MY_MZ_M$ 15 is computed as (12.3424, 2.3471, −0.051, −0.211°, 0.056°, −0.002°.

Figure 5:
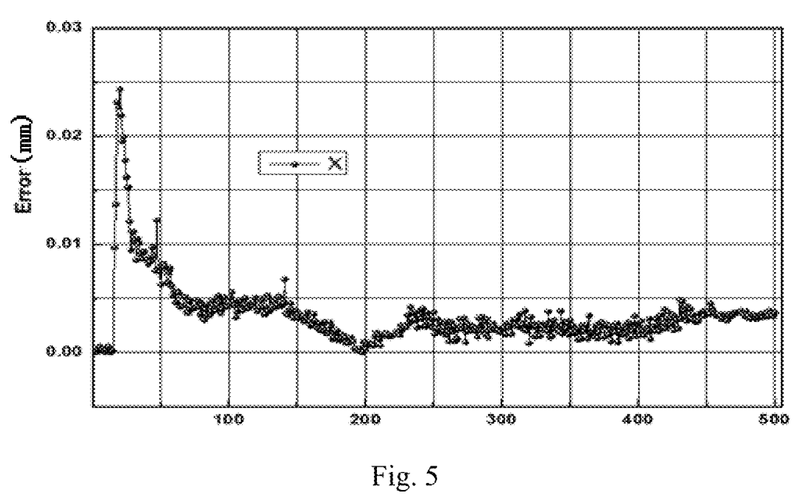
FIG. 5 shows the X component of the machine tool interpolated contouring error solved by the vision method.
Figure 6:
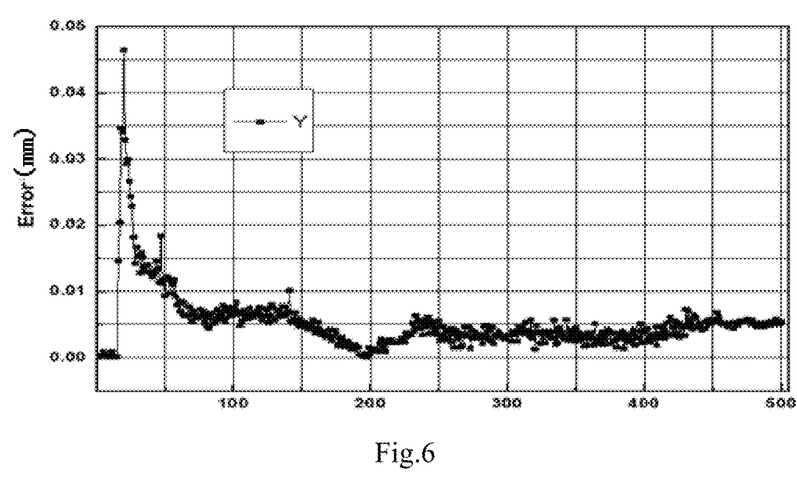
FIG. 6 shows the Y component of the machine tool interpolated contouring error solved by the vision method.
Figure 7:
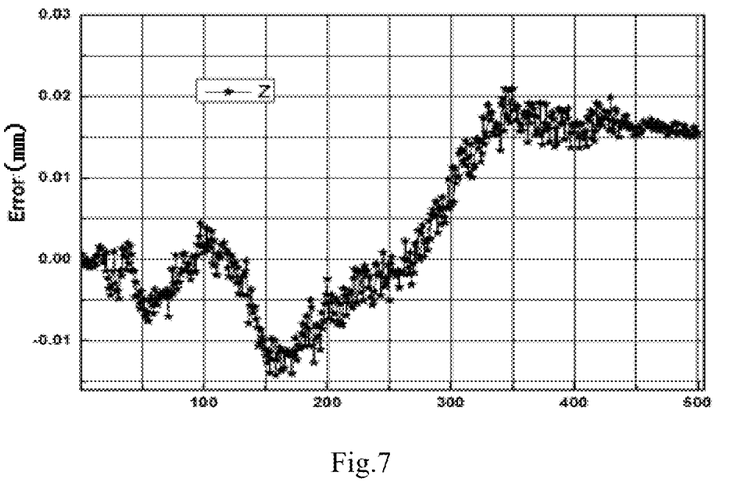
FIG. 7 shows the Z component of the machine tool interpolated contouring error solved by the vision method.
Figure 8:
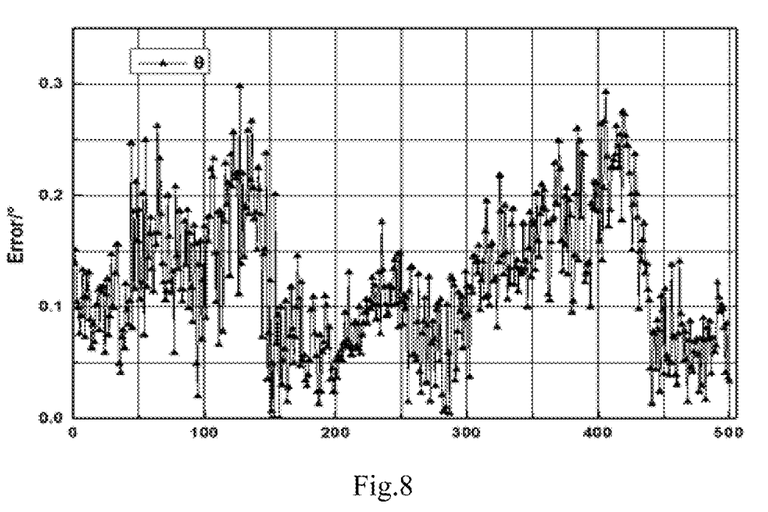
FIG. 8 shows the pitch component $\theta_i$ of the machine tool interpolated contouring error solved by the vision method.
Figure 9:
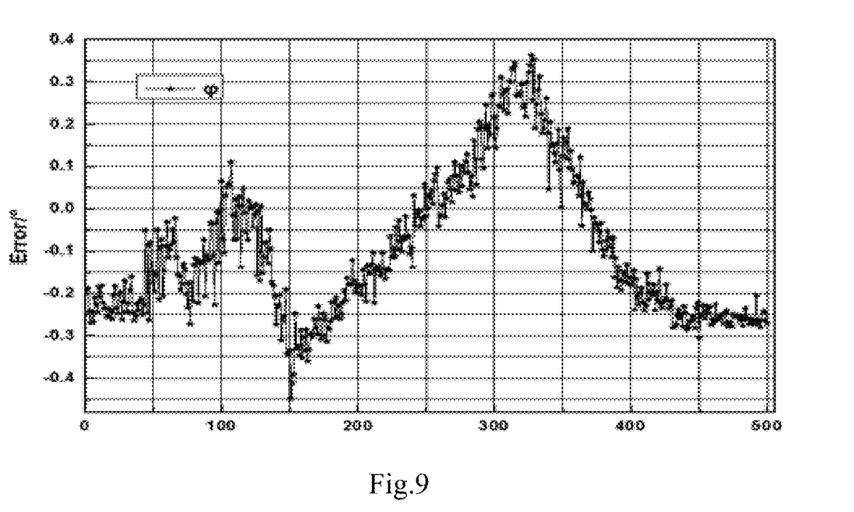
FIG. 9 shows the roll component $\Phi_i$ of the machine tool interpolated contouring error solved by the vision method.
Figure 10:
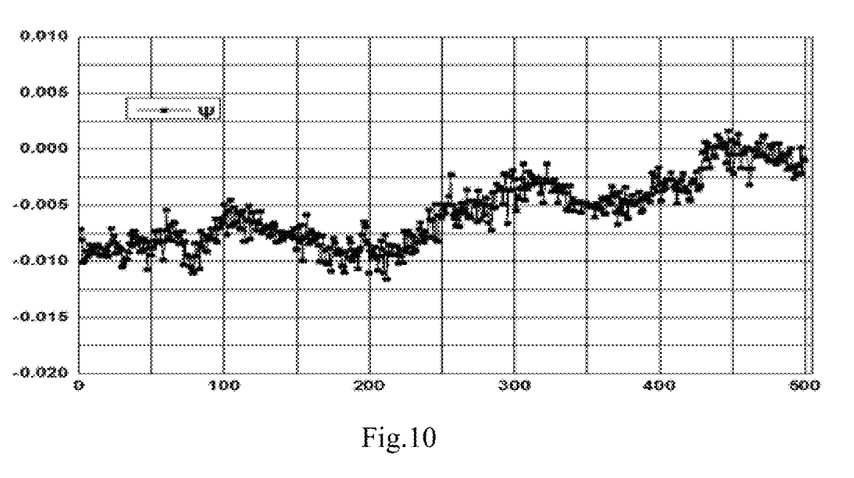
FIG. 10 shows the yaw component $\psi_i$ of the machine tool interpolated contouring error solved by the vision method.

Step 4 Each shot frame image is traversed in accordance with the above method to obtain the final interpolation contour in the machine tool coordinate system $O_MX_MY_MZ_M$ 15 represented by the coded primitive 8 with a code value of 235; and the six-degree-of-freedom contouring error of the path interpolated by the CNC machine tool 4 is solved by comparing the actual six-degree-of-freedom contour $L_r$ with the nominal contour $L_m$. FIG. 5, FIG. 6 and FIG. 7 respectively show X, Y and Z components of the machine tool interpolated contouring error solved by the vision method. FIG. 8, FIG. 9 and FIG. 10 respectively show pith, roll and yaw components of the machine tool interpolated contouring error solved by the vision method. It can be clearly seen from the figures that, the method can be used to conveniently solve a contouring error of the path interpolated by the machine tool.

The method uses a monocular vision pose algorithm to realize six-dimensional measurement for large-range arbitrary contouring error of the CNC machine tool under small field of view in combination with priori spatial constraints among the coded primitives on the large-size standard plate, and extends measurable motion range and measurement dimension of the vision system. The measurement system and method of the present invention have low cost and simple operation.

We claim:

1. A monocular vision six-dimensional measurement method for high-dynamic large-range arbitrary contouring error of computer numerical control (CNC) machine tool, characterized in that the method uses a measurement fixture and a measuring system which are specially designed, and in combination with priori knowledge, the monocular vision pose algorithm is used to promote vision measurable dimension and range of interpolation contouring errors of machines; the whole machine tool motion contour is represented by a selected reference primitive; a small field of view is used to enhance the measurement accuracy of the visible coded primitives; then, six-dimensional information of X, Y, Z, pitch, roll and yaw of the machine tool interpolation contour represented by the reference primitive in machine tool coordinate system is obtained through datum transformation; the method is used to traverse each shot frame image to obtain the final actual six-dimensional motion contour of the machine tool; a six-dimensional contouring error generated by the computer numerical control (CNC) machine tool interpolation is computed by comparing the measured contour with the nominal one; specific steps of the method are as follows:

first step: installing the measurement fixture and the measurement system which are specially made the measurement fixture specially made is composed of a base (10), a high-brightness short-time light-emitting unit (9), a priori standard plate (7) and coded primitives (8); the priori standard plate (7) is made of transparent base material, and the coded primitives (8) with unique code values and matrice distribution are coated on the priori standard plate (7); when the measurement fixture is installed, the high-brightness short-time light-emitting unit (9) is inserted into grooves on both sides of the base (10); the priori standard plate (7) is supported on the base (10); the priori standard plate (7) is pressed by two pressing plates (6); four pressing plate locking bolts (5) are used to press and fix the priori standard plate (7) through the pressing plates (6);

the measurement system comprises a camera (1), a camera clamp (2) and the measurement fixture; the camera (1) is fixed to the camera clamp (2); the camera clamp (2) is installed above the measurement fixture to collect sequential images in the motion process of the measurement fixture; the assembled measurement fixture is put on an optical three-coordinate device platform; an optical three-coordinate device calibrates a space geometry relation among the coded primitives (8) under a global coordinate system of the priori standard plate; when the measurement system is arranged, the calibrated measurement fixture is fastened to a rotary table (3) of the computer numerical control (CNC) machine tool (4) through a pressing bolt (11) and a pressing nut (12);

second step: establishing the global coordinate system of the priori standard plate the global coordinate system $O_GX_GY_GZ_G$ (14) of the priori standard plate is established on the measurement fixture; an origin is established on the center of the coded primitive (8) in the first row and the first column, and is defined as $O_G$; the direction of the $X_G$ coordinate axis is that the origin $O_G$ downwards points to the center point of the coded primitive (8) in the first column and the last row on the array; the direction of the $Y_G$ coordinate axis is that the $O_G$ points towards the right to the center point of the coded primitive (8) in the first row and the last column on the array; the $Z_G$ coordinate axis is determined by a right-handed rule; the optical three-coordinate device is used to calibrate the space geometry relation among the coded primitives (8) under the global coordinate system $O_GX_GY_GZ_G$ (14) of the priori standard plate to obtain three-dimensional coordinates of the coded primitives (8) under the global coordinate system $O_GX_GY_GZ_G$ (14) of the priori standard plate; the coded primitives (8) on the priori standard plate (7) carry motion information of the computer numerical control (CNC) machine tool (4); the spatial position relationship among the coded primitives (8) is calibrated through a high-accuracy device; on the premise of ensuring calibration accuracy, the size of the priori standard plate (7) can be made as large as possible to satisfy large-scale measurement demands of the contouring error;

third step: camera calibration a camera imaging model expresses a one-to-one mapping relationship between a camera coordinate system and a world coordinate system; the camera imaging model with distortion parameters is:

$$Z_c \begin{bmatrix} u+\delta_x \\ v+\delta_y \\ 1 \end{bmatrix} = \begin{bmatrix} C_x & 0 & u_0 \\ 0 & C_y & v_0 \\ 0 & 0 & 1 \end{bmatrix} \begin{bmatrix} R_C^I & T_C^I \\ 0^T & 1 \end{bmatrix} \begin{bmatrix} X_w \\ Y_w \\ Z_w \\ 1 \end{bmatrix} = K \cdot T \cdot \begin{bmatrix} X_w \\ Y_w \\ Z_w \\ 1 \end{bmatrix} \quad (1)$$

where $(X_w, Y_w, Z_w)$ is a three-dimensional coordinate of the center point of the coded primitive (8) under the world coordinate system; K is an intrinsic matrix of the camera (1); T is an extrinsic matrix of the camera (1); (u,v) is a two-dimensional coordinate of the center point of the coded primitive (8) in an image plane; $(u_0, v_0)$ is coordinate of the principal point; $(C_x, C_y)$ is an equivalent focal length in transverse and longitudinal direction; $R_C^I$ and $T_C^I$ are respectively rotation and translation transformation matrixes between the camera coordinate system and the world coordinate system; $(\delta_x, \delta_y)$ is a distortion of an image point in the directions of x and y caused by an imperfect optical system; checker calibration boards is placed in multiple positions in the field of view (21) of the camera (1) and the images are acquired; distortion parameters as well as the intrinsic and extrinsic matrixes of the camera (1) are calibrated through a calibration algorithm proposed by Zhengyou Zhang, "A flexible new technique for camera calibration," in IEEE Transactions on Pattern Analysis and Machine Intelligence, vol. 22, no. 11, pp. 1330-1334, November 2000, doi: 10.1109/34.888718 (Year: 2000);

fourth step: high-definition no-fuzzy image collection and processing for high-dynamic and large-range interpolation contour of computer numerical control (CNC) machine tool on the basis of completing the installation and arrangement of the measurement fixture, images of the contour interpolated by the computer numerical control (CNC) machine tool (4) are collected; because requirements for the measurement accuracy of the contouring error are high, the required field of view (21) for shooting is small; firstly, the parameters of the camera (1) are adjusted so that the camera (1) is under the optimal shooting field of view and frame frequency;

subsequently, the camera (1) and the high-brightness short-time light-emitting unit (9) are synchronously triggered; light-emitting time and light-emitting intensity of the high-brightness short-time light-emitting unit (9) are set to ensure that the high-brightness short-time light-emitting unit (9) penetrates through the base of the priori standard plate (7) within the exposing time of the camera (1) and supplements light for the coded primitives (8); high-traverse speed machine tool speed which can reflect dynamic performance of the machine tool is selected; each motion axis of the computer numerical control (CNC) machine tool (4) is driven to interpolate the contour in accordance with the program instructions; in the process of image collection of the machine tool movement, the camera (1) is fixed and the machine tool moves; clear and no-fuzzy sequential images of the coded primitives (8) are collected under the assistance of the high-brightness short-time light-emitting unit (9);

after the images are collected, the code values represented by each coded primitive (8) on the images are recognized, then the two-dimensional pixel coordinates of the center point of each decoded coded primitive (8) is positioned through a gray centroid method; the center of coded primitives is positioned by an extraction algorithm of the gray centroid method, with a computation expression as follows:

$$\begin{cases} x = \dfrac{\sum_{i=m}^{m}\sum_{j=1}^{n} i \times f(i,j)}{\sum_{i=1}^{m}\sum_{j=1}^{n} f(i,j)} \\ y = \dfrac{\sum_{i=1}^{m}\sum_{j=1}^{n} j \times f(i,j)}{\sum_{i=1}^{m}\sum_{j=1}^{n} i \times f(i,j)} \end{cases} \quad (2)$$

where (i, j) represents the pixel point in image plane; m and n are the number of pixels included in the image in the transverse direction and the longitudinal direction; (x, y) is a center-of-mass coordinate of the image; f(i, j) is a gray value at the pixel coordinate (i, j);

fifth step: six-dimensional computation for high-dynamic and large-range arbitrary contouring error of computer numerical control (CNC) machine tool in the method, a small field of view (21) is used to enhance the measurement accuracy of the coded primitives (8) in the field of view; in combination with priori knowledge, the monocular vision pose algorithm is used to promote vision measurable dimension and range of interpolation contouring errors of machines; the whole machine tool motion contour is represented by a selected reference primitive; the position of the reference primitive in an invisible region of the field of view (21) is computed by the pixel coordinates of the primitives in visible region in combination with high-accuracy priori constraints; the motion contour represented by the reference primitive in the machine tool coordinate system is obtained through datum transformation by traversing all the images; a six-dimensional contouring error generated by the interpolation of the computer numerical control (CNC) machine tool (4) is computed by comparing the measured contour with the nominal one; six-dimensional computation steps for high-dynamic and large-range arbitrary contouring error of computer numerical control (CNC) machine tool are specifically as follows:

the field of view (21) of the camera (1) is N×N (unit: mm); the external dimension of the priori standard plate (7) is M×M (unit: mm); N is much smaller than M; besides the above global coordinate system $O_G$-$X_G Y_G Z_G$ (14) of the priori standard plate, involved coordinate systems also comprise a camera coordinate system $O_C$-$X_C Y_C Z_C$ (13), a machine tool coordinate system $O_M$-$X_M X_M Y_M Z_M$ (15) and a local coordinate system $O_{Li}$-$X_{Li} Y_{Li} Z_{Li}$ (22) of the priori standard plate; the origin of the camera coordinate system $O_C$-$X_C Y_C Z_C$ (13) is established on an optical center $O_C$; when the computer numerical control (CNC) machine tool (4) does not move, four coded primitives $P_1^1$ 16, $P_1^2$ 17, $P_1^3$ 18 and $P_1^4$ 19 arranged in a rectangle in the field of view are selected in the first frame image; the coded primitive $P_1^1$ 16 is selected as a reference primitive; the motion contour of the computer numerical control (CNC) machine tool (4) synthesized by the interpolation motion axis of each axis is represented by the coded primitive $P_1^1$ 16; the coordinate in the global coordinate system $O_G\text{-}X_GY_GZ_G$ (14) of the priori standard plate is $^GP_1^1(^GX_1^1, {}^GY_1^1, {}^GZ_1^1)$; the machine tool coordinate system $O_M\text{-}X_MY_MZ_M$ (15) is established by taking $P_1^1$ 16 as an origin; the direction of each coordinate axis of the machine tool coordinate system $O_M\text{-}X_MY_MZ_M$ (15) is consistent with the direction of each motion axis of the computer numerical control (CNC) machine tool (4); the machine tool is controlled to drive the measurement fixture to respectively move along the X axis direction of the machine tool to multiple positions; the three-dimensional coordinate (x,y,z) of $P_1^1$ 16 relative to the camera coordinate system $O_C\text{-}X_CY_CZ_C$ (13) in each position is computed using a monocular vision pose solving algorithm; on this basis, a vector in the X axis direction is fitted; the Y axis of the machine tool coordinate system $O_M\text{-}X_MY_MZ_M$ (15) is determined in accordance with the same rule; the Z axis of the machine tool coordinate system $O_M\text{-}X_MY_MZ_M$ (15) is determined by the right-handed rule; X axis and Y axis are established in accordance with the following formula:

$$\begin{cases} \dfrac{x - {}^CX_1^1}{m_x} = \dfrac{y - {}^CY_1^1}{n_x} = \dfrac{z - {}^CZ_1^1}{p_x} \\ \dfrac{x' - {}^CX_1^1}{m_y} = \dfrac{y' - {}^CY_1^1}{n_y} = \dfrac{z' - {}^CZ_1^1}{p_y} \\ \begin{pmatrix} {}^MX \\ {}^MY \\ {}^MZ \\ 1 \end{pmatrix} = M_C^M \begin{pmatrix} {}^CX \\ {}^CY \\ {}^CZ \\ 1 \end{pmatrix} \end{cases} \quad (3)$$

where $^CP_1^1(^CX_1^1, {}^CY_1^1, {}^CZ_1^1)$ is the three-dimensional coordinates of the coded primitive $P_1^1$ 16 in the camera coordinate system $O_CX_CY_CZ_C$ (13) in the first frame image; (x',y',z') is the three-dimensional coordinates of point $P_1^1$ 16 relative to the camera coordinate system $O_CX_CY_CZ_C$ 13 in each position computed using the monocular vision pose solving algorithm by the measurement fixture that moves along the X axis direction of the machine tool to multiple positions; $(m_x,n_x,p_x)$ is a vector in the X axis direction of the machine tool coordinate system $O_MX_MY_MZ_M$ (15); $(m_y,n_y,p_y)$ is a vector in the Y axis direction of the machine tool coordinate system $O_MX_MY_MZ_M$ (15); $(^CX, {}^CY, {}^CZ)$ is a three-dimensional coordinates of a point in the camera coordinate system $O_CX_CY_CZ_C$ (13); $(^MX, {}^MY, {}^MZ)$ is a three-dimensional coordinates of a point in the machine tool coordinate system $O_MX_MY_MZ_M$ (15); $M_C^M$ is a transformation matrix between the camera coordinate system $O_CX_CY_CZ_C$ 13 and the machine tool coordinate system $O_MX_MY_MZ_M$ (15);

during measurement, the priori standard plate (7) continuously makes interpolation motion along with the machine tool, and the coded primitives (8) thereon are continuously imaged on the camera (1); in the motion process of the computer numerical control (CNC) machine tool (4), the camera (1) collects G frame images totally; four coded primitives (8) that appears in the field of view in the ith frame image and arranged in a rectangle are $P_i^1$ 23, $P_i^2$ 24, $P_i^3$ 25 and $P_i^4$ 26; the coordinates of the centers of the four coded primitives (8) in the global coordinate system $O_GX_GY_GZ_G$ (14) of the priori standard plate are $^GP_i^1(^GX_i^1, {}^GY_i^1, {}^GZ_i^1)$, $^GP_i^2(^GX_i^2, {}^GY_i^2, {}^GZ_i^2)$, $^GP_i^3(^GX_i^3, {}^GY_i^3, {}^GZ_i^3)$ and $^GP_i^4(^GX_i^4, {}^GY_i^4, {}^GZ_i^4)$; corresponding two-dimensional pixel coordinates on the image plane are $p_i^1(u_i^1,v_i^1)$, $p_i^2(u_i^2,v_i^2)$, $p_i^3(u_i^3,v_i^3)$ and $p_i^4(u_i^4,v_i^4)$; a local coordinate system $O_{Li}X_{Li}Y_{Li}Z_{Li}$ (22), (i=1, 2 ... G) of the priori standard plate under the ith frame is established; the coordinate system takes $P_i^1$ 23 as a coordinate origin; $XL_i$ and $YL_i$ coordinate axis directions are respectively parallel to $X_G$ and $Y_G$ directions of the global coordinate system $O_GX_GY_GZ_G$ 14 of the priori standard plate; $Z_{Li}$ coordinate axis is determined by the right-handed rule; three-dimensional coordinates of the centers of the selected four coded primitives (8) in the local coordinate system $O_{Li}X_{Li}Y_{Li}Z_{Li}$ (22) of the priori standard plate are:

$$\begin{cases} \begin{pmatrix} {}^{Li}X_i^m \\ {}^{Li}Y_i^m \\ {}^{Li}Z_i^m \\ 1 \end{pmatrix} = \begin{pmatrix} I & T_i^T \\ 0 & 1 \end{pmatrix} \begin{pmatrix} {}^GX_i^m \\ {}^GY_i^m \\ {}^GZ_i^m \\ 1 \end{pmatrix} \; m = 1, 2, 3, 4 \\ T_i = (^GX_i^1, {}^GY_i^1, {}^GZ_i^1) \end{cases} \quad (4)$$

where $T_i$ is a transformation matrix between the global coordinate system $O_GX_GY_GZ_G$ (14) of the priori standard plate of the ith frame image and the local coordinate system $O_{Li}X_{Li}Y_{Li}Z_{Li}$ (22) of the priori standard plate; the ith frame image (i=1, 2 ... G) is computed as follows:

$$\begin{cases} Y_i^2 + Z_i^2 - 2Y_iZ_i\cos\alpha = a'^2 \\ X_i^2 + Z_i^2 - 2X_iZ_i\cos\beta = b'^2 \\ X_i^2 + Y_i^2 - 2X_iY_i\cos\gamma = c'^2 \end{cases} \quad (5)$$

where $X_i$ is a distance from the optical center $O_C$ in the camera coordinate system $O_CX_CY_CZ_C$ (13) to the $P_i^1$ 23 point on the priori standard plate (7) of the ith frame; $Y_i$ is a distance from the optical center $O_C$ in the camera coordinate system $O_CX_CY_CZ_C$ (13) to the $P_i^2$ 24 point on the priori standard plate 7 of the ith frame; $Z_i$ is a distance from the optical center $O_C$ in the camera coordinate system $O_CX_CY_CZ_C$ (13) to the $P_i^4$ 26 point on the priori standard plate 7 of the ith frame; a' is a distance between $P_i^1$ 23 and $P_i^2$ 24 in the global coordinate system $O_GX_GY_GZ_G$ of the priori standard plate (7) of the ith frame; a' is a distance between $P_i^2$ 24 and $P_i^4$ 26 in the global coordinate system $O_GX_GY_GZ_G$ (14) of the priori standard plate of the ith frame; c' is a distance between $P_i^1$ 23 and $P_i^4$ 26 in the global coordinate system $O_GX_GY_GZ_G$ (14) of the priori standard plate of the ith frame; α is an angle $\angle P_i^2O_CP_i^4$ between straight lines $O_CP_i^2$ and $O_CP_i^4$; β is an angle $\angle P_i^2O_CP_i^4$ between straight lines $O_CP_i^1$ and $O_CP_i^4$; γ is an angle $\angle P_i^1O_CP_i^2$ between straight lines $O_CP_i^1$ and $O_CP_i^2$;

$$\cos\alpha = \left(\frac{u_i^2-u_0}{C_x}\right)\left(\frac{u_i^4-u_0}{C_x}\right)+\left(\frac{v_i^2-v_0}{C_y}\right)\left(\frac{v_i^4-v_0}{C_y}\right) \Bigg/ \sqrt{\left(\frac{u_i^2-u_0}{C_x}\right)^2+\left(\frac{v_i^2-v_0}{C_y}\right)^2} \cdot$$
$$\sqrt{\left(\frac{u_i^4-u_0}{C_x}\right)^2+\left(\frac{v_i^4-v_0}{C_y}\right)^2},$$

$$\cos\gamma = \left(\frac{u_i^1-u_0}{C_x}\right)\left(\frac{u_i^2-u_0}{C_x}\right)+\left(\frac{v_i^1-v_0}{C_y}\right)\left(\frac{v_i^2-v_0}{C_y}\right) \Bigg/ \sqrt{\left(\frac{u_i^1-u_0}{C_x}\right)^2+\left(\frac{v_i^1-v_0}{C_y}\right)^2} \cdot$$
$$\sqrt{\left(\frac{u_i^2-u_0}{C_x}\right)^2+\left(\frac{v_i^2-v_0}{C_y}\right)^2},$$

$$\cos\beta = \left(\frac{u_i^1-u_0}{C_x}\right)\left(\frac{u_i^4-u_0}{C_x}\right)+\left(\frac{v_i^1-v_0}{C_y}\right)\left(\frac{v_i^4-v_0}{C_y}\right) \Bigg/ \sqrt{\left(\frac{u_i^1-u_0}{C_x}\right)^2+\left(\frac{v_i^1-v_0}{C_y}\right)^2} \cdot$$
$$\sqrt{\left(\frac{u_i^4-u_0}{C_x}\right)^2+\left(\frac{v_i^4-v_0}{C_y}\right)^2};$$

k=2 cos α, q=2 cos β, r=2 cos γ, c'$^2$=vZ$_i^2$, a'$^2$=ac'$^2$=avZ$_i^2$, b'$^2$=bc'$^2$=bvZ$^2$, X$_i$=xZ$_i$, Y$_i$=bZ$_i$, P$_i^1$ 23, P$_i^2$ 24 and P$_i^4$ 26 are set as three spatial points in the ith frame that are not coplanar and whose position relation is known, and k$^2$+q$^2$+r$^2$−kqr−1≠0 is satisfied; equation (5) is rewritten as formula (6);

$$\begin{cases} (1-a)y^2-ax^2+axyr-yk+1=0 \\ (1-b)x^2-by^2+bxyr-xq+1=0 \end{cases} \quad (6)$$

the degenerate solution of the formula (6) is eliminated through an optimization algorithm to obtain four acceptable zero solutions; P$_i^3$ 25 is used as a priori constraint to obtain unique solutions of X$_i$, Y$_i$ and Z$_i$; then three-dimensional coordinates $^CP_i^1$($^CX_i^1$, $^CY_i^1$, $^CZ_i^1$), $^CP_i^2$($^CX_i^2$, $^CY_i^2$, $^CZ_i^2$) and $^CP_i^4$($^CX_i^4$, $^CY_i^4$, $^CZ_i^4$) of P$_i^1$ 23, P$_i^2$ 24 and P$_i^4$ 26 points on the priori standard plate (7) of the ith frame under the camera coordinate system O$_C$X$_C$Y$_C$Z$_C$ (13) are expressed as the following formula:

$$\begin{cases} ^CX_i^j = \frac{u_i^1}{C_x}\cdot|O_CP_i^j| \Big/ \sqrt{\left(\frac{u_i^1}{C_x}\right)^2+\left(\frac{v_i^1}{C_y}\right)^2+1} \\ ^CY_i^j = \frac{v_i^1}{C_y}\cdot|O_CP_i^j| \Big/ \sqrt{\left(\frac{u_i^1}{C_x}\right)^2+\left(\frac{v_i^1}{C_y}\right)^2+1} \\ ^CZ_i^j = 1\cdot|O_CP_i^j| \Big/ \sqrt{\left(\frac{u_i^1}{C_x}\right)^2+\left(\frac{v_i^1}{C_y}\right)^2+1} \end{cases} \quad (7)$$

j = 1, 2, 4; i = 1, 2 ... G;

on the basis of the known $^{Li}P_i^j$($^{Li}X_i^j$, $^{Li}Y_i^j$, $^{Li}Z_i^j$) and $^CP_i^j$($^CX_i^j$, $^CY_i^j$, $^CZ_i^j$), a Kabsch algorithm is used for solving a rotation matrix R$_i'$ and a translation matrix t$_i'$ of the local coordinate system O$_{Li}$X$_{Li}$Y$_{Li}$Z$_{Li}$ 22 of the priori standard plate of the ith frame relative to the camera coordinate system O$_C$-X$_C$Y$_C$Z$_C$ (13); t$_i'$ is the three-dimensional coordinates t$_i'$=$^CP_i^1$($^CX_i^1$, $^CY_i^1$, $^CZ_i^1$) of the origin P$_i^1$ 23 of the local coordinate system O$_{Li}$X$_{Li}$Y$_{Li}$Z$_{Li}$ (22) of the priori standard plate of the ith frame in the camera coordinate system O$_C$X$_C$Y$_C$Z$_C$ (13); a pitch angle θ$_i'$, a roll angle Φ$_i'$ and a yaw angle ψ$_i'$ between two coordinate systems are computed through R$_i'$ separation: the three-dimensional coordinates ($^CX_i$, $^CY_i$, $^CZ_i$);

$$(^CX_i, ^CY_i, ^CZ_i)^T = \begin{pmatrix} R_i'^T & t_i'^T \\ 0 & 1 \end{pmatrix}\begin{pmatrix} I & T_i^T \\ 0 & 1 \end{pmatrix}(^GX_i, ^GY_i, ^GZ_i)^T$$

of the reference primitive P$_1^1$ in the camera coordinate system O$_C$X$_C$Y$_C$Z$_C$ (13) of the ith frame is computed according to a known spatial constraint among the coded primitives (8) of the priori standard plate ($^7$);

the measured contouring error is represented in the machine tool coordinate system O$_M$X$_M$Y$_M$Z$_M$ 15, and the contour measured by the camera (1) needs to be subjected to coordinate transformation to correctly compute the machine tool contouring error; a pose transformation formula of the machine tool coordinate system O$_M$X$_M$Y$_M$Z$_M$ (15) and the local coordinate system O$_{Li}$X$_{Li}$Y$_{Li}$Z$_{Li}$ (22) of the priori standard plate is:

$$M_i = M_C^M\begin{pmatrix} R_i' & t_i'^T \\ 0 & 1 \end{pmatrix}, \quad (8)$$

where M$_i$ is a transformation matrix between the local coordinate system O$_{Li}$X$_{Li}$Y$_{Li}$Z$_{Li}$ (22) of the priori standard plate under the ith frame image and the machine tool coordinate system O$_M$X$_M$Y$_M$Z$_M$ (15); a pitch angle θ$_i$, a roll angle Φ$_i$ and a yaw angle ψ$_i$ of the ith frame standard plate relative to the machine tool coordinate system O$_M$X$_M$Y$_M$Z$_M$ (15) are separated from M$_i$, all image sequences are traversed to obtain a six-degree-of-freedom contour L$_r$ of the whole machine tool represented by the reference primitive, where L$_r$($^MX_i$, $^MY_i$, $^MZ_i$, θ$_i$, Φ$_i$, ψ$_i$) and i=1, 2 . . . G; a six-degree-of-freedom contouring error E generated by interpolation of the computer numerical control (CNC) machine tool (4) is computed by comparing the actual six-degree-of-freedom contour L$_r$ with the nominal contour L$_m$:

$$E = L_r - L_m \quad (9).$$

\* \* \* \* \*